May 27, 1952 — K. T. KÄLLE — 2,598,178
TEMPERATURE RESPONSIVE MEASURING AND INDICATING APPARATUS
Filed July 12, 1949
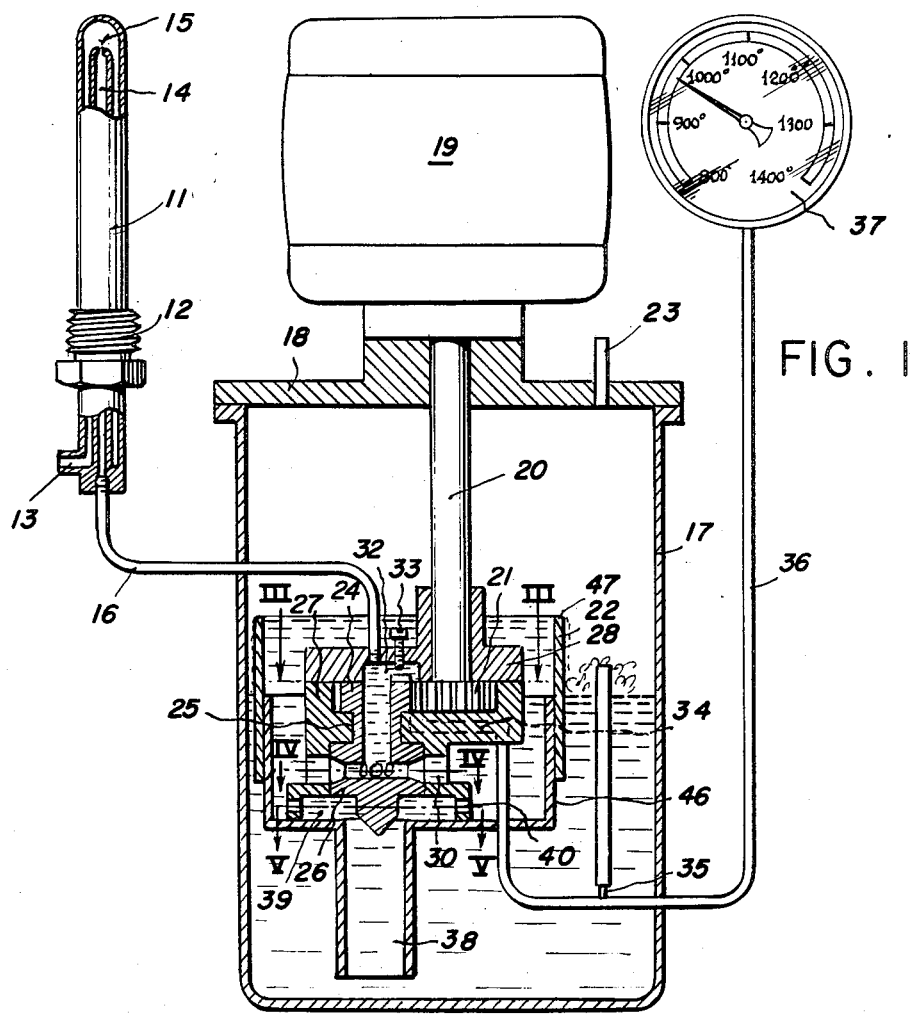
FIG. 1
FIG. 2
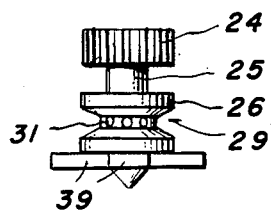
Inventor
KARL TORSTEN KALLE,
By Wenderoth, Lind & Ponack
Attorneys Inventor
KARL TORSTEN KALLE,
By Wenderoth, Lind & Ponack
Attorneys Patented May 27, 1952

2,598,178

UNITED STATES PATENT OFFICE 2,598,178

TEMPERATURE RESPONSIVE MEASURING AND INDICATING APPARATUS

Karl Torsten Källe, Saffle, Sweden

Application July 12, 1949, Serial No. 104,364
In Sweden July 5, 1949

7 Claims. (Cl. 73—357)

The invention relates to an indicating apparatus which for instance may be used for measuring temperatures. The apparatus is adapted to be connected to a feeling member having a capillary opening through which a gas flow is caused to pass. More generally, the apparatus may be used to control the density of any gas stream, or to control the width of a capillary opening passed by a gas having a constant density.

The apparatus according to the invention comprises in combination, a hollow member having a capillary opening adapted to be passed by a gas flow, a rotatable compressor pump connected to said member by a gas conduit, an inlet passage for liquid on the suction side of the compressor, a rotatable element mounted in said passage and arranged to rotate in timed relation to the compressor to provide a continuous rotating liquid ring, the speed of rotation of which will be dependent on the viscosity of the liquid as well as on the speed of rotation of the rotatable element, said gas conduit ending in the liquid passage between the rotating element and the compressor whereby a mixture of gas and liquid is pumped by the pump, the pressure in the gas conduit determining the volumes of liquid and gas passing the compressor, a restricted outlet for liquid and gas from the pressure side of the compressor, and a conduit from said pressure side communicating with an instrument indicating the pressure.

Particularly in the practice of measuring temperatures, the invention involves a considerable progress. As is commonly known, thermoelements have hitherto been considered to be the most exact instruments for measuring rather high temperatures. However, they can be used only within a certain limited temperature range; below about 800° C. the thermoelectric currents will not be measurable and above 1200–1300° C. highly unreliable readings are obtained. Under no circumstances are the thermoelectric currents great enough to be directly utilized for regulating purposes and upon a possible amplifying of their effect, substantial errors will occur owing to uncontrollable potential drops in the connection conductors, etc.

According to the invention, it is now possible to measure and regulate temperatures with an exactness hitherto not known, and the apparatus makes it possible to measure temperatures from the lowest occurring in the practice up to, for instance, 2000° C. This upper limit is only dependent on the heat resistance of the material of the feeling member. Also, the invention provides for a quick indication or regulation even at very small variations in temperatures, in that the impulse forces give rise to very great regulating forces.

An apparatus according to the invention is described in the following with reference to the accompanying drawings.

In the drawings:

Fig. 1 shows a vertical section of an embodiment of an apparatus used for measuring temperatures.

Fig. 2 shows a view of the rotatable element.

Figure 6:
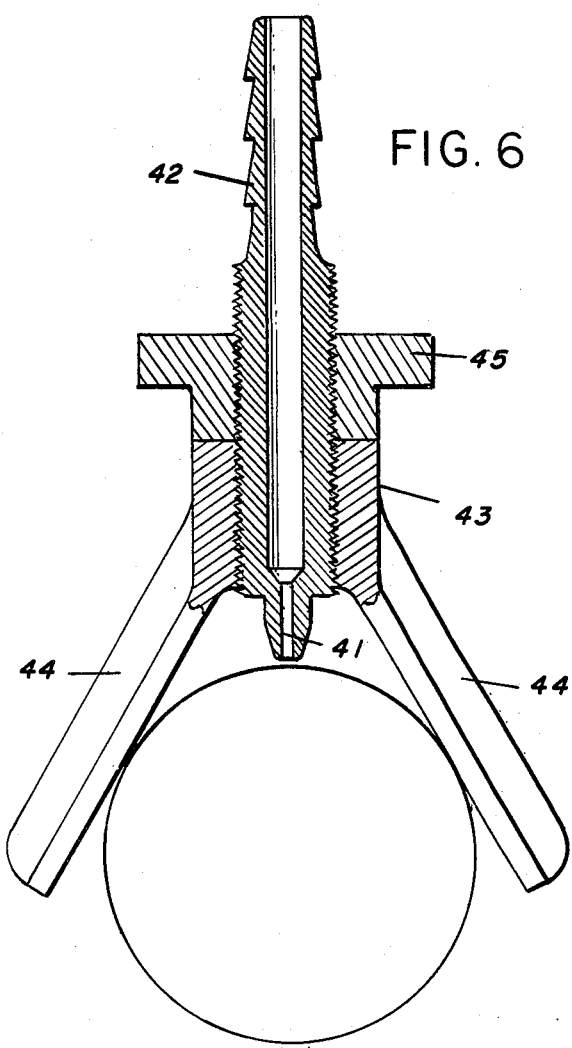

Fig. 6 finally shows another embodiment of the feeling member adapted to be used for a particular purpose.

A feeling member which may be inserted in a medium or a space the temperature of which is to be determined, is shown to the left in Fig. 1 and consists of a tubular casing 11, closed at the outer end, and provided with a threaded portion 12 adapted to be screwed into the wall of a furnace, or the like. At its other end, the casing 11 is in communication with the atmosphere or another source of gas by an inlet 13. Another tube 14 concentrically inserted in the tube 11 has a capillary opening 15 at its inner end, said tube 14 at its outer end being connected by conduit 16 to an indicating apparatus hereafter described. The feeling member described above and at least in principle is previously known per se, and functions in such a way that the gas sucked into the space between the tubes 11 and 14 is heated to the temperature of the medium outside the feeling member, and thereby its density is changed more or less. The gas passing the conduit 16 has regained the room temperature before it is introduced into the compressor and, as the compressor sucks an exact volume, there will be a varying pressure in the capillary opening 15 resulting in a higher or lower pressure of the gas sucked in by the compressor.

Figure 3:
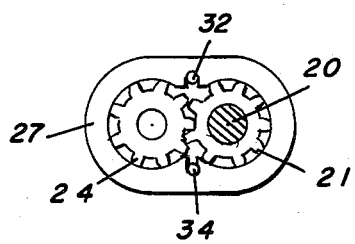
Fig. 3 shows a horizontal section along the lines III—III in Fig. 1.

Further, the apparatus shown in Fig. 1 comprises a container 17 for holding a liquid and having a cap 18 supporting an electric motor 19. The motor has an elongated, vertical driving shaft 20 extending into the container. At the lower end of this shaft, there is fixed a gear wheel 21 forming part of a gear wheel pump or compressor (Fig. 3) of the type having a constant pump volume. Said compressor is submerged in liquid in a vessel 22 placed in the container 17 and the purpose of this vessel will be described hereinafter. The cap 18 is closely fitted on the container, but has an outlet 23 by which the inside of the container 17 is in communication with the atmosphere.

The driven gear wheel 24 of the compressor is mounted on a hollow shaft 25, preferably made integral with a wheel 26. The compressor as well as the wheel 26 are enclosed in a casing 27 provided with a cap 28 forming a bearing for the shaft 20. The shaft 25 is supported in the casing 27.

Figure 4:
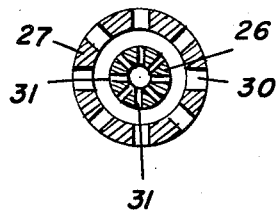
Fig. 4 shows a horizontal section along the lines IV—IV in Fig. 1.

The wheel 26 (see also Fig. 2) has a peripheral groove 29 which, together with a surrounding cylindrical wall in the casing, 27 forms a ring-shaped space in which liquid is introduced from the vessel 22 through a plurality of radial openings 30 in the wall of the casing 27 (see also Fig. 4). From said ring-shaped space, the liquid passes through radial channels 31 in the wheel 26 and upwards through the hollow shaft 25 to the channel 32 arranged in the cap 28 and leading to the suction side of the compressor pump. Also, the gas conduit 16 ends in this channel 32 immediately above the hollow shaft 25. An adjusting screw 33 is inserted through the cap 28 and may be screwed more or less into the channel 32. A conduit 34 is connected to the pressure side of the compressor and is adapted to discharge the mixture of gas and liquid from the latter. Before said mixture reaches the container 17, it must pass through a restricted opening 35. A branch 36 leading from the conduit 34 is connected to a manometer 37 graded in °C.

The vessel 22 surrounding the compressor is composed of two cylindrical portions overlapping each other. The lower portion 46 is secured to the inner wall of container 17 by any suitable means such as brackets or the like, not shown in the drawing for clarity, and the upper portion 47 may be raised or lowered as desired for purposes hereinafter to be set forth. If desired the parts 46 and 47 can be screw thread attached to facilitate movement of the portion 47. Due to this arrangement the upper edge of vessel 22 can be maintained always above a required liquid level in the container 17. In the operation of the apparatus, said vessel 22 is adapted to be filled with liquid, and for that purpose it has at its bottom an opening 38 in the form of a pipe socket through which the liquid is pumped in from the container 17. The liquid portion not being drawn into the suction conduit of the compressor overflows the upper edge of the vessel 22, and the amount of liquid introduced in the vessel is so measured, that some overflow always occurs. As seen in Fig. 1, the pipe socket 38 extends downwards into the container 17 and the intended purpose thereof is to provide for sucking in a liquid freed from gas.

Figure 5:
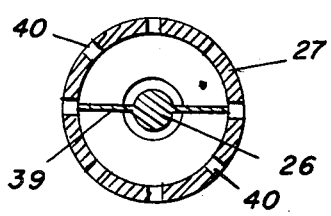
Fig. 5 shows a horizontal section along the lines V—V in Fig. 1.

The wheel 26 adapted to introduce the liquid into the suction conduit of the compressor may, if desired, be constructed to cause the liquid to circulate through the vessel 22 and overflow from vessel 22. For that purpose the pipe socket 38 is mounted in alignment with the shaft 25 and the wheel 26 has at its bottom side two fans or blades 39 (see also Figs. 2 and 5) which rotate in a cylindrical space arranged between the bottom side of the casing 27 and the bottom of the vessel 22. As seen in Figs. 1 and 5, the lower part of the casing 27 has radial openings 40 through which the liquid entering from the socket 38 is forced into the vessel 22. In other words, the described device acts as a centrifugal pump to circulate and maintain the level of the liquid at the brim of portion 47. To make possible any desired alterations of the static pressure of the liquid at the suction conduit inlet (the channels in the wheel 26), the height of the vessel 22 may be adjustable. For that purpose, said vessel 22 may consist of two cylindrical parts, one of which is screwed on the other one and thus the height can be adjusted by turning the upper part in either direction.

The apparatus described operates in the following manner:

When the motor 19 operates, the compressor pump 21, 24 sucks partly liquid from the ring-shaped space around the wheel 26 and partly gas from the conduit 16. As mentioned above, liquid and gas are mixed with each other in the channel 32 and the mixture is introduced on the suction side of the compressor. As the volume and rotation speed of the compressor are constant, the sum of the volumes of gas and liquid sucked in per unit of time is also constant. From the pressure side of the compressor, the mixture of liquid and gas is discharged into the container 17 through the conduit 34 and the restricted opening 35, the resistance in the latter being dependent on the proportion between liquid and gas in the mixture. The more gas, the easier the mixture flows through the restricted opening, and consequently the pressure in the conduit 34 will be reduced. At an increased proportion of liquid in the mixture, the pressure will be correspondingly higher. The amount of gas in the mixture is determined by the temperature in the feeling member 11 at the capillary opening 15. As very small amounts of gas are here in question, the pressure loss in the conduit 16 may be overlooked.

On account of the change of density of the gas at different temperatures, the pressure fall in the capillary opening 15 will be dependent on the temperature. If, for instance, the temperature rises, a smaller quantity of gas by weight is introduced into the conduit 16, resulting in a lower pressure at the channel 32. Hereby the sucked in quantity of liquid is increased and at the same time the quantity of gas is reduced. Thus, the mixture passing the compressor will contain less gas, the pressure in the conduit 36 will consequently increase and the manometer 37 will show a higher value corresponding to the new temperature. At falling temperature around the feeling member 11 the pressure fall in the capillary opening 15 is diminished, i. e., a greater quantity of gas is introduced in the conduit 16, and the gas pressure on the suction side of the compressor will be higher. The sucked in quantity of liquid is then decreased in proportion to the increased quantity of gas so that the pressure in the conduit 36 is reduced, and a lower reading is obtained on the manometer 37.

The above described principle of causing a compressor to operate with a mixture of a compressible and an incompressible medium (gas and liquid) whereby small variations in the impulse forces caused by the compressible medium are transformed to considerable regulating forces, has been heretofore utilized. In the present case, however, when very small quantities of gas are introduced through a capillary opening, other variables may be of influence which were not previously considered. Especially changes in the rotation speed of the compressor (caused by fluctuations in the number of cycles of the electric current) and variations in the temperature in the container 17 reduce the exactness of the apparatus described, particularly in the case where highly exact indications are desired. According to the invention, however, the influence of the two variables, have been wholly eliminated by arranging the rotating element (the wheel 26) in the liquid inlet passage to the suction side of the compressor.

The variations in the motor speed has such an influence that an increased speed will cause a too high reading on the manometer and vice versa. This, of course, depends on the fact that the capacity of the compressor is changed with the rotation speed and that thereby a higher or lower pressure is required to force the mixture of gas and liquid through the restricted opening 35 in the conduit 34. This is compensated by the fact that on the suction side of the compressor, before the mouth of the conduit 16, the liquid has to pass the ring-shaped space formed around the rotating wheel 26. Said wheel rotates at the same speed as the compressor and by means of friction it causes the liquid in the ring-shaped space to rotate. The rotating liquid ring is, of course, subjected to the influence of the centrifugal force. Thus, the pressure caused by said centrifugal force is to be overcome before the liquid reaches the suction side of the compressor. If for instance the speed of the compressor, and consequently that of the wheel 26, is increased, the liquid ring will also have a greater rotation speed, the influence of the centrifugal force upon the liquid ring is increased, and the resistance against the entrance of the liquid is increased. Thereby the pressure at the outlet of the gas conduit 16 will sink so that the sucked in quantity of gas increases at the same time as the quantity of liquid is reduced. The mixture of liquid and gas will be more rich in gas so that it will more easily pass the restricted opening 35, and the pressure in the conduit 34 and the manometer is not increased in spite of the rotation speed of the compressor being higher. By dimensioning the ring-shaped space in a suitable manner, it is thus possible to achieve that an alteration of the rotation speed is always compensated by a change in the proportion between the quantity of gas and liquid in the mixture passing the restricted opening 35.

The variations of temperature in the container 17 are of still more importance, even if generally only rather small variations are in question, such as are occuring in the room in which the apparatus is situated. Against that, the temperature of the gas coming from the feeling member is not of any substantial importance; on the one hand the gas is substantially cooled before its entrance in the apparatus, and on the other hand the actual quantities of gas are insignificant. If, for instance, the temperature in the container 17 is somewhat increased, then the volume and the pressure of the gas introduced will also be increased and the viscosity of the liquid is decreased. Thus, at the same time as a mixture richer in gas passes the compressor, the decreased viscosity of the liquid will cause a smaller outflow through the restricted opening 35, i. e., both these variables co-operate to leave a too low pressure indication on the manometer. This source of error is also removed by the rotating liquid ring.

As seen in Fig. 1 the liquid ring is limited by four surfaces: the bottom and the two side surfaces of the slot 29 and the cylindrical inner wall of the casing. Three of these surfaces rotate, while the fourth, the wall of the casing, is stationary. This latter will therefore exert a braking action on the rotation of the liquid ring so that the rotation speed of the liquid ring will be somewhat slower than that of the wheel 26. At a higher viscosity of the liquid, the ring is moved more easily and obtains a somewhat higher rotation speed. At a lower viscosity the case will, of course, be opposite.

When referring to the rotation speed of the liquid ring, the average speed of this ring is meant. In fact, the different portions of the ring have different speeds. The liquid layers located closest to the surfaces of the wheel 26 are moved at substantially the same speed as that of the wheel, while the liquid layer closest to the wall of the casing is almost stationary. Inwardly to the core of the ring, the rotation speeds will, of course, be dependent on the distance from the different surfaces.

If now, as assumed above, the temperature increases in the apparatus, whereby the viscosity of the liquid decreases, the liquid ring will consequently rotate somewhat slower, whereby the centrifugal forces acting upon it are reduced. Then the liquid may more easily pass into the channels 31 in the wheel 26, and the liquid pressure on the suction side of the compressor will increase so that more liquid and less gas flow through the compressor. Hereby the increased outflow through the restricted opening 35 is compensated, as is also the loss of pressure which otherwsie would arise in the outlet conduit 34. By dimensioning the surfaces surrounding the liquid ring correctly, the effect may be obtained that no only the reduced viscosity of the liquid is compensated, but also that the increased liquid pressure will compensate the higher gas pressure occurring as a consequence of the increased temperature. Thus, the reading on the manometer will be wholly independent of all changes of the temperature in the container 17.

Regarding the exactness of the apparatus, it is also of importance that the static pressure is constant at the inlet of the suction conduit. This is achieved by means of the vessel 22 described above, which vessel provides that the liquid level is always at a constant height above said inlet. Above the liquid, the container is filled with gas of atmospheric pressure (the outlet 23). Variations in the atmospheric pressure may be compensated by adjusting the height of the vessel, such adjustment being made by turning the threaded upper part of the vessel.

Depending on the capacity of the compressor, the described apparatus has a very great sensitivity. The pressure impulses from the capillary 15 may without difficulties be amplified up to 10,000 times or more. This signifies that a variation in pressure of 0.1 mm. water column in the capillary is amplified to a pressure variation of 1 atmosphere on the manometer. In such a way it is possible, for instance at 1000° C., to measure the temperature with an exactness of ± 0.5° C., which is more than sufficient in the practice.

Instead of a common simple manometer it is, of course, possible to connect the conduit 36 to a diagrammatically indicating instrument or to another pressure measuring instrument of any kind. The great regulating forces obtained may also be utilized for regulating purposes in that the pressure conduit 36 may be connected to a suitable regulating device. Indicating, as well as regulating devices, may without inconvenience simultaneously be connected to the pressure conduit 36.

It is also possible to obtain the same indicating effect by connecting the feeling member containing the capillary opening to the outlet 23 from the container 17, so that instead the gas conduit 16 on the suction side of the compressor is in free communication with the atmosphere. In such case, gas is instead blown out through the capillary opening, but this difference has no fundamental influence upon the manner of action of the apparatus.

If desired the correct indication of the apparatus may be controlled in the following manner: A specially made plate having a very exactly dimensioned boring is mounted before the gas inlet 13 to the feeling member. This latter is held at a constant temperature, for instance at 20° C. If the apparatus is without errors, the pointer on the manometer 37 will stand at a mark especially applied for this control.

As mentioned in the preamble of the specification the apparatus according to the invention may with the same advantage be used also for other purposes than measuring and regulating temperatures. The embodiment shown in the drawing may, for instance, without any modification be used to determine the density of gases. The feeling member 11 and the gas which is to be examined are then held at a constant low temperature, and the pressure fall in the capillary 15 is in direct proportion to the density of the gas passing through said capillary. In this way it is possible to control variations in the composition of a gas mixture, as for instance a mixture of $CO_2$ with air, the proportion of $CO_2$ in combustion gases, or the proportion of $SO_2$ in gases at paper mills. The pressure measuring instrument may be directly graduated in percent $CO_2$, percent $SO_2$, etc.

In some cases the apparatus according to the invention may be used as a micrometer. Fig. 6 shows the construction of a feeling member adapted for such a purpose. A tube 42 having a capillary opening 41 is threaded through a supporting member 43 which has two legs 44 forming between each other an angle of for instance 60°. A locking nut 45 is arranged to fix the tube 42 in adjusted position. By means of this device it is possible for instance to control variations in the diameter of a machined cylindrical member mounted in a lathe. The manner of functioning of the described device will be clear from Fig. 6. In dependence on a shorter or longer distance between the cylindrical surface and the mouth of the capillary, there will be a higher or lower resistance to a gas being sucked into or blown out from the capillary, and this will cause a higher or lower pressure fall in the latter. The variations are indicated by the pressure measuring instrument on the pressure side of the compressor and such an instrument may be graduated in suitable fractional parts of a millimeter. In the device as last described, it might be most suitable to have the feeling member connected to the outlet 23 from the container 17, so that the gas stream is blown out through the capillary. In sucking an air stream, the capillary can be contaminated by dust particles.

It is obvious that the construction of the apparatus described in this specification and shown on the drawings may be modified as to a plurality of details without departing from the idea of the invention.

I claim:

1. An indicating apparatus for measuring temperatures and the like, comprising a gas source, a hollow member open to said gas source and having a capillary opening adapted to be passed by a gas flow, a liquid container, a rotatable compressor pump in said container, a gas conduit connecting said pump to said member, said compressor pump having a liquid inlet passage on the suction side thereof, a rotatable element mounted in said liquid inlet passage and arranged to rotate in timed relation to the compressor pump to provide a continuous rotating liquid ring in said passage, the speed of rotation of said liquid ring being dependent on the viscosity of the liquid as well as on the speed of rotation of the rotatable element whereby changes in the speed of rotation of the pump as well as changes in the temperature of the liquid are compensated, said gas conduit ending in said liquid inlet passage between the rotatable element and the compressor pump whereby a mixture of gas and liquid is pumped by said pump, the pressure in the gas conduit determining the volumes of liquid and gas passing the compressor pump, a conduit connected to the pressure side of said pump, a restricted outlet for gas and liquid connected into said conduit, said conduit from said pressure side extending beyond said restricted outlet, and an instrument for indicating pressure connected to said extended conduit.

2. An apparatus according to claim 1, and including a cylindrical casing surrounding said rotatable element, said element being formed as a wheel, said wheel having an annular groove along the periphery thereof and together with the surrounding wall of said cylindrical casing forming a ring-shaped space, said casing having a channel through the wall thereof adapted to supply liquid to said space from said container, said wheel having an axial channel and a radial channel therethrough communicating with each other to allow the liquid to pass onto the suction side of the compressor pump from said space.

3. An indicating apparatus for measuring temperatures and the like, comprising a gas source, a hollow member open to said gas source and having a capillary opening adapted to be passed by a gas flow, a liquid container having an opening in its stop and adapted to be partly filled with liquid, an open vessel placed within the container adapted to be filled with liquid adapted for circulating through it, a rotatable compressor pump, a gas conduit connecting said pump to said hollow member, said compressor pump having a liquid inlet passage on the suction side thereof, said compressor pump and liquid inlet passage being placed within said open vessel, a rotatable element mounted in said liquid inlet passage and arranged to rotate in timed relation to the compressor pump to provide a continuous rotating liquid ring in said passage, the speed of rotation of said liquid ring being dependent on the viscosity of the liquid as well as on the speed of rotation of the rotatable element whereby changes in the speed of rotation of the pump as well as changes in the temperature of the liquid are compensated, said gas conduit ending in said liquid inlet passage between the rotatable element and the compressor pump whereby a mixture of gas and liquid is pumped by said pump, the pressure in said gas conduit determining the volumes of liquid and gas passing the compressor pump, a conduit connected to the pressure side of said pump, a restricted outlet for gas and liquid connected into said conduit from the pressure side of the compressor and opening into said container, an extension of said conduit from said pressure side, a pressure indicating instrument communicating with said extended conduit.

4. An apparatus according to claim 4, and wherein the vertical walls of said vessel are adjustable as to the height thereof to extend higher or lower in said container.

5. An indicating apparatus for measuring temperatures and the like, comprising a gas source, a hollow member open to said gas source and having a capillary opening adapted to be passed by a gas flow, a liquid container having an opening in its top and adapted to be partly filled with liquid, an open vessel placed within the container adapted to be filled with liquid adapted for circulating through it, a rotatable compressor pump, a gas conduit connecting said pump to said hollow member, said compressor pump having a liquid inlet passage on the suction side thereof, said compressor pump and liquid inlet passage being placed in said vessel, a rotatable wheel mounted in a cylindrical portion of said liquid inlet passage and arranged to rotate in timed relation to the compressor pump, said wheel having an annular groove along the periphery thereof and together with the surrounding wall of the cylindrical passage forming a ring-shaped space, said wall having a channel therethrough adapted to supply liquid to said space from said container, said wheel having an axial channel and a radial channel therethrough communicating with each other to allow the liquid to pass onto the suction side of the compressor pump, said gas conduit ending in said liquid inlet passage between the rotatable wheel and the compressor pump whereby a mixture of gas and liquid is pumped by said pump, the pressure in the gas conduit determining the volumes of liquid and gas passing the compressor pump, a conduit connected to the pressure side of said pump and having connected thereto a restricted outlet for gas and liquid from the pressure side of the compressor pump to the container, and an instrument for indicating pressure communicating with an extension of said conduit from said pressure side.

6. An indicating apparatus for measuring temperatures and the like, comprising a gas source, a hollow member open to said gas source and having a capillary opening adapted to be passed by a gas flow, a container having an opening in its top and adapted to be partly filled with liquid, an open vessel placed within the container, a suction pump mounted in an opening in the bottom of the vessel to cause the latter to be filled with liquid and cause overflowing at its upper edge, a rotatable compressor pump, a gas conduit connecting said pump to said hollow member, said compressor pump having a liquid inlet passage on the suction side thereof, said compressor pump and liquid inlet passage being placed within said open vessel, a rotatable element mounted in the liquid inlet passage and arranged to rotate in timed relation to the compressor pump whereby a continuous rotating liquid ring is formed, the speed of rotation of said liquid ring being dependent on the viscosity of the liquid as well as on the speed of rotation of the rotatable element, said gas conduit ending in the liquid inlet passage between the rotatable element and the compressor pump whereby a mixture of gas and liquid is pumped by said pump, the pressure in the gas conduit determining the volumes of liquid and gas passing the compressor pump, a conduit connected to the pressure side of said pump and having connected thereto a restricted outlet for gas and liquid from the pressure side of the compressor pump to the container, an instrument for indicating pressure communicating with an extension of said conduit from said pressure side.

7. An indicating apparatus according to claim 6 and wherein said suction pump consists in a centrifugal pump and the rotatable wheel in the liquid inlet passage to the compressor pump is combined with said centrifugal pump sucking the liquid into the vessel.

KARL TORSTEN KÄLLE.

REFERENCES CITED

The following references are of record in the file of this patent:

FOREIGN PATENTS

| Number | Country | Date |
|---|---|---|
| 211,880 | Great Britain | Apr. 16, 1925 |